UNITED STATES PATENT OFFICE.

JOHN F. SANDERS, OF ROSEBURG, OREGON, ASSIGNOR TO FRANK H. CHURCHILL AND OLIVER P. COSHOW, BOTH OF ROSEBURG, OREGON.

PROCESS OF MANUFACTURING NITRIC ACID AND OTHER NITROGEN COMPOUNDS FROM ATMOSPHERIC AIR.

1,349,919.   Specification of Letters Patent.   Patented Aug. 17, 1920.

No Drawing.   Application filed October 23, 1917. Serial No. 198,168.

*To all whom it may concern:*

Be it known that I, JOHN F. SANDERS, a citizen of the United States, residing at Roseburg, in the county of Douglas and State of Oregon, have invented new and useful Improvements in Processes of Manufacturing Nitric Acid and other Nitrogen Compounds from Atmospheric Air, of which the following is a clear and correct specification.

The object of my invention is to produce nitric acid in one operation in a high state of purity and in much larger quantities and with less expense than can be done in the processes now in use.

In the use of my invention it will be of advantage to pass the air over or through dry potassium hydroxid in order to absorb the carbon dioxid that exists in the air in small quantities.

In order to carry my invention into effect it is of much importance that the purified air, which contains generally about 78 per cent. of nitrogen and about 20 per cent. of oxygen, be so composed that it contains all the ingredients required to form nitric acid, according to the equation $N+O_3+H=HNO_3$ which requires the addition of pure oxygen in sufficient quantities to supply three equivalents of the same to every and each equivalent of nitrogen present. The amount of hydrogen is carefully calculated so that the amount of the same, in its subsequent combustion, with an adequate amount of oxygen, will raise the temperature of the entire gas-mixture to such a degree of heat that the combination of the nitrogen and oxygen will take place with alacrity. These two elements begin to combine in a temperature above 250° C. but will combine more rapidly and more thoroughly at temperature near 500° C. while in temperatures of 1000° and over the same combinations are again dissociated.

From this it is apparent that the amount of hydrogen to be added is not only very important but the controlling factor in this process. In case the hydrogen, thus required does not produce the sufficient amount of moisture then the insufficiency is supplied by steam or vapor.

It is well known that one gram of hydrogen in its combustion with oxygen sets free 34,180 calories, from which it is comparatively easy to calculate the amount of hydrogen required for effective production of nitric acid.

The gas-mixture, composed as above stated, is injected either as separate ingredients, or as a mixed mass, into a conduit, which has sufficient length to permit of a perfect diffusion of the different gases before arriving at the resistance units near the other end of said conduit, which may be disposed in a transverse position and in such numbers above each other, or rows arranged in a staggering position, as to insure an intimate contact of the gas-mixture with said resistance units, which are maintained in a state of incandescence, and in this state ignite the hydrogen in said gas-mixture into combustion with an adequate amount of oxygen and cause the nitrogen and oxygen to combine with each other, in the presence of the moisture, or water in a comminuted form, produced by the burning hydrogen, forming nitrogen oxids, which in turn absorb the moisture, and thus from 80 to 90 per cent. of the entire gas-mixture is converted into nitric acid, provided the required ingredients were present in their proper quantities. Moreover only pure nitric acid can under such conditions be produced.

The resistance units should be made of platinum, or any other material that has sufficient natural resistance to become incandescent when an electric current passes over it. The function of these resistance units is to ignite the hydrogen into combustion with an adequate amount of oxygen, and for this purpose they are shunted into an electric circuit and made and maintained in a state of incandescence for any length of time required for that purpose.

The nitric acid fumes as they come from the resistance units are pressed forward into either condensing tubes or absorbing liquids, as may be desired. However, since the condensation and absorption of the nitric acid fumes into nitric acid or into nitrates is carried out in the usually employed manner no further description of the condensation and absorption of the fumes into nitrates is here required, and therefore it is merely stated that in case it is desired to produce a commercial nitric acid, i. e. a nitric acid that contains less than 98 per cent. of $HNO_3$ the required moisture may be added to the gas-mixture or the nitric acid, in the form of pure water to bring it to any strength desired.

By this invention commercial nitric acid may be made by using a spray of pure water repeatedly until the water has absorbed all the nitric acid of which it is capable.

What I claim as my invention is:

1. The process of forming oxids of nitrogen, which comprises passing a mixture containing nitrogen, oxygen and hydrogen over platinum, heated to any desired degree of incandescence by an electric current.

2. The process of forming oxids of nitrogen which comprises passing a mixture containing nitrogen, hydrogen and oxygen over electrical resistance units heated to incandescence.

3. The process of forming acid which comprises passing a mixture containing nitrogen, hydrogen and oxygen over electrical resistance units heated to incandescence to form oxid of nitrogen, and bringing said mixture into intimate contact with water in a comminuted form, so as to quickly cause the oxids to combine with the water to form an acid.

4. The process of forming acid which comprises passing a mixture of nitrogen, oxygen and hydrogen in intimate contact over resistance units heated to incandescence by an electric current.

5. The process of forming acid which comprises passing a mixture of nitrogen, oxygen and hydrogen in contact with resistance units, made of platinum, heated to any desired degree of temperature by an electric current.

6. The process of forming acid, which comprises passing a mixture of nitrogen, oxygen, hydrogen and moisture, the oxygen and hydrogen being in such proportions as to produce the required temperature, over and through a sufficient number of vertical rows of resistance units made of platinum, heating them to incandescence by an electric current, thereby producing the combustion of the gas mixture resulting in the production of nitrogen oxids.

7. The process of forming nitric acid which comprises the mixing of atmospheric air with oxygen, moisture, and hydrogen, which by its combustion with an equivalent amount of oxygen produces a temperature necessary to produce the combustion of nitrogen and the remaining oxygen into nitrogen oxids and finally into nitric acid, substantially as described.

8. The process of forming nitric acid which comprises the ignition and combustion of hydrogen in a mixture of atmospheric air, oxygen and moisture, with an equivalent amount of oxygen within said mixture, thus creating and distributing the required heat throughout the entire gas-mixture, and producing by the created heat the formation of nitric acid, substantially as described.

9. The process of forming nitric acid by passing a mixture of atmospheric air, oxygen, hydrogen and moisture over and between a multiple of resistance units, heated to incandescence by an electric current, igniting the hydrogen to combustion with an equivalent amount of oxygen, thus creating and distributing the necessary temperatures for the combustion of the nitrogen and oxygen into nitrogen oxids, their reaction with the moisture, and conversion into nitric acid, substantially as described.

In witness whereof I have hereunto subscribed my name in the presence of two witnesses.

JOHN F. SANDERS.

Witnesses:
 CHAS. F. HOPKINS,
 ALICE BLACK.